US011197142B1

(12) United States Patent
Kontopidis et al.

(10) Patent No.: US 11,197,142 B1
(45) Date of Patent: Dec. 7, 2021

(54) METHODS AND SYSTEMS FOR COMMUNICATING WITH DEVICE CASES

(71) Applicant: Bose Corporation, Framingham, MA (US)

(72) Inventors: George Kontopidis, Sherborn, MA (US); Michael W. Elliot, North Grafton, MA (US); Marc Nicolas Gudell, Milford, MA (US); Douglas Warren Young, Arlington, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/892,917

(22) Filed: Jun. 4, 2020

(51) Int. Cl.
*H04R 1/10* (2006.01)
*H04W 4/80* (2018.01)
*H04W 76/10* (2018.01)

(52) U.S. Cl.
CPC .............. *H04W 4/80* (2018.02); *H04R 1/10* (2013.01); *H04R 1/1025* (2013.01); *H04W 76/10* (2018.02); *H04R 2420/07* (2013.01)

(58) Field of Classification Search
CPC .............................. H04W 4/80; H04W 76/10
See application file for complete search history.

(56) References Cited

U.S. PATENT DOCUMENTS 9,843,853 B2 12/2017 Hirsch et al.
10,616,735 B2 * 4/2020 Nakano ................... H04W 4/50
2017/0064429 A1 3/2017 Hirsch et al.
2017/0064433 A1 3/2017 Hirsch et al.
2018/0124491 A1 5/2018 Dragicevic et al.
2019/0268706 A1 * 8/2019 Solum ................... G16H 50/20

FOREIGN PATENT DOCUMENTS

EP 3473130 A1 4/2019

OTHER PUBLICATIONS

International Search Report and the Written Opinion of the International Searching Authority, International Patent Application No. PCT/US2021/034257, pp. 1-16, dated Sep. 15, 2021.

* cited by examiner

*Primary Examiner* — Tuan H Nguyen
(74) *Attorney, Agent, or Firm* — Bond, Schoeneck & King, PLLC

(57) ABSTRACT

An audio system and method for establishing wireless data connections between a case and at least one wearable audio device is provided. The audio system can establish a first wireless data connection between the case and the wearable audio device and establish a second wireless data connection between the case and the internet. The case, in addition to electrical energy storage capacity or battery bank capabilities, can directly communicate with the internet to receive update data directly from a remote server and can pass on update data to wearable audio devices without the need for a peripheral device such as a smart phone or tablet operating an affiliated software application. The audio system provided allows for information, data, and functionality to be passed between the wearable audio devices and cloud-based services, via the case, including social networking, messaging, music services, news, entertainment, and Voice-Over-Internet-Protocol (VOIP) communication services.

20 Claims, 9 Drawing Sheets

METHODS AND SYSTEMS FOR COMMUNICATING WITH DEVICE CASES

BACKGROUND

Aspects and implementations of the present disclosure are generally directed to systems and methods for sending and receiving wireless data, for example, audio data or update data, between wearable audio devices and cases configured to receive the wearable audio devices.

Although cases for wearable audio devices are usually carried with the user while the wearable audio devices are in use, these cases typically have limited functionality. Often, cases have a singular or dual-purpose, i.e., to act as a "battery bank" to extend the long-term usage of the wireless wearable audio devices without needing to connect to a mains power supply, and protection of the wearable audio devices when not in use. Additionally, when the wearable audio devices are not in use, and are stored away within the case, a user may wirelessly connect or pair their case to a peripheral device running an affiliated software application to pass data, e.g., update data, from the peripheral device to the case, so that when the wearable audio devices are stored in the case and the case is connected to the peripheral device, the case may relay data from the peripheral device to the wearable audio devices.

SUMMARY OF THE DISCLOSURE

The present disclosure relates to an audio system and methods for establishing wireless data connections between a case and at least one wearable audio device. The audio system can establish a first wireless data connection between the case and the wearable audio device and also establish a second wireless data connection between the case and the internet. In this way, and in addition to electrical energy storage capacity or battery bank capabilities, the case can directly communicate with the internet to receive update data directly from a remote server and can pass update data to wearable audio devices without the need for a peripheral device such as a smart phone or tablet operating an affiliated software application. As cases are typically carried by the user or close to the user while using the wearable audio devices, this configuration allows for data and information to be passed between the wearable audio devices and cloud services, via the case, including social networking, messaging, music services, news, entertainment, and Voice-Over-Internet-Protocol (VOIP) communication services. Furthermore, this configuration can provide seamless integration between the case and in-the-home wireless devices such as smart speakers, smart soundbars, etc., and enables transfer of audio streaming data from the case to, e.g., home smart speakers.

Additionally, benefits of the present audio system, e.g., a system where the case for the wearable audio devices connects directly to the internet rather than through a peripheral device such as a smart phone, include benefits to the manufacturer and to the user. Benefits for the manufacturer include: the ability to provide faster updates to the wearable audio devices during manufacturing, e.g., in a reduction of re-flashing time or uploading time; the ability to provide device updates Over-The-Air (OTA) at the point of sale or as soon as the user purchases the wearable audio devices and the case; the ability to maintain contact with the user for extended durations of time via the dedicated connection to the internet; unification of in-the-home and on-the-go products involving Cloud Services; and the ability to collect and store data relating to user profiles, usage patterns and preferences, sensor data including sensor data obtained from additional wearable devices such as a smart-watch or wristband, etc. User benefits of the present audio system include: transparent updates to the latest software/firmware and easy access to the latest product features; faster updates while the wearable audio devices are in the case; smaller size or form factor for the wearable audio devices if current functionality is off-loaded onto the case; and freedom from requiring a connection to a peripheral device, e.g., a smart phone, for routine non-streaming applications and updates. Furthermore, the additional connectivity and functionality of the case can create new device environments where multiple cases are configured to communicate with each other and/or synchronize with a third party source and provide users with synchronized content, e.g., synchronized audio streams. Once additional connectivity between the case and the internet or Cloud-based services is possible via the configuration provided, a further benefit to both the user and the manufacturer can include, obtaining or extracting diagnostic data from all of the devices within audio system 100 and sending that diagnostic data via the second wireless data connection over the internet I to a Cloud-based service which can utilize the data to improve user experiences.

Moreover the present application provides systems and methods to allow a user to switch between an operational mode where the wearable audio devices are paired or connected directly with the peripheral device, e.g., a smart phone, and the peripheral device is also configured to establish a second connection with the internet, and an operational mode where the wearable audio devices are paired or connected with the case, and the case is configured to establish a second connection with the internet. The user can switch into and between these modes using a user input which can include: an electronic signal associated with depression or engagement with a button, touch-capacitive sensor, surface, or touchscreen; an electronic signal associated with a motion or gesture of the user via a gyroscope, an accelerometer, or a magnetometer; an electronic signal associated with the proximity of each audio device within system relative to each other or relative to the user via a proximity sensor; the devices positions or locations via a Global Positioning Service (GPS) sensor; a voice or sound input via a microphone, or a visual input taken via a camera.

In one example, a system is provided, the system includes a wearable audio device and a case, the wearable audio device configured to matingly engage with the case, the case configured to establish a first wireless data connection with the wearable audio device and configured to establish a second wireless data connection that provides access to the Internet. The case is further configured to receive update data associated with the wearable audio device using the second wireless data connection, and transmit the update data to the wearable audio device using the first wireless data connection.

In an aspect, in a first mode, the wearable audio device is configured to receive and render audio data related to an audio playback from a peripheral device, and wherein in a second mode, the wearable audio device is configured to receive and render the audio data related to the audio playback from the case.

In an aspect, the case is configured to switch between the first mode and the second mode in response to a user input.

In an aspect, the user input is selected from, a mechanical input, a touch-capacitive sensor input, a gesture input, or a voice input.

In an aspect, the gesture input is obtained from an accelerometer, a gyroscope, a magnetometer, or a global positions systems sensor.

In an aspect, the first wireless data connection uses Bluetooth Classic, Bluetooth Low-Energy (BLE), or Low-Power Radio Frequency communications.

In an aspect, the case further comprises memory arranged to store at least one of: audio data files, user profile data, or sensor data.

In an aspect, the case does not include a display.

In an aspect, the case includes a display.

In an aspect, the case further includes at least one battery and a connection interface for charging the wireless audio device.

In an aspect, the case further comprises a lid, and the case is configured to switch between a first mode and a second mode based on: (i) whether the lid is open or closed, and/or (ii) whether the first wearable audio device is matingly engaged with the case.

In an aspect, the case is arranged to receive data from an additional wearable device, wherein the additional wearable device is a smart watch, smart wristband, a biological monitoring device, or a pedometer.

In an aspect, the data obtained from the additional wearable device includes biological data related to a user.

In an aspect, the case is arranged to establish a Voice Over Internet Protocol connection using the second wireless data connection.

In an aspect, the case is arranged to establish a case-to-case data connection with an additional case within an environment via the second wireless data connection.

In another example, a method of establishing wireless data connections between a case and a wearable audio device is provided, the method comprising: establishing a first wireless data connection between the case and the wearable audio device; establishing, via the case, a second wireless data connection that provides access to the Internet; receiving update data associated with the wearable audio device via the second wireless data connection; and transmitting the update data to the wearable audio device using the first wireless data connection.

In an aspect, in a first mode, the wearable audio device is configured to receive and render audio data related to an audio playback from a peripheral device, and wherein in a second mode, the wearable audio device is configured to receive and render the audio data related to the audio playback from the case.

In an aspect, the case is configured to switch between the first mode and the second mode in response to a user input.

In an aspect, the case further comprises a lid, and the case is configured to switch between a first mode and a second mode based on: (i) whether the lid is open or closed, and/or (ii) whether the first wearable audio device is matingly engaged with the smart case.

In an aspect, the case further includes at least one battery and a connection interface for charging the wireless audio device.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure relates to an audio system and methods for establishing wireless data connections between a case and at least one wearable audio device. The audio system can establish a first wireless data connection between the case and the wearable audio device and also establish a second wireless data connection between the case and the internet. In this way, and in addition to electrical energy storage capacity or battery bank capabilities, the case can directly communicate with the internet to receive update data directly from a remote server and can pass update data to wearable audio devices without the need for a peripheral device such as a smart phone or tablet operating an affiliated software application. As cases are typically carried by the user or close to the user while using the wearable audio devices, this configuration allows for data and information to be passed between the wearable audio devices and cloud services, via the case, including social networking, messaging, music services, news, entertainment, and Voice-Over-Internet-Protocol (VOIP) communication services.

Figure 1:
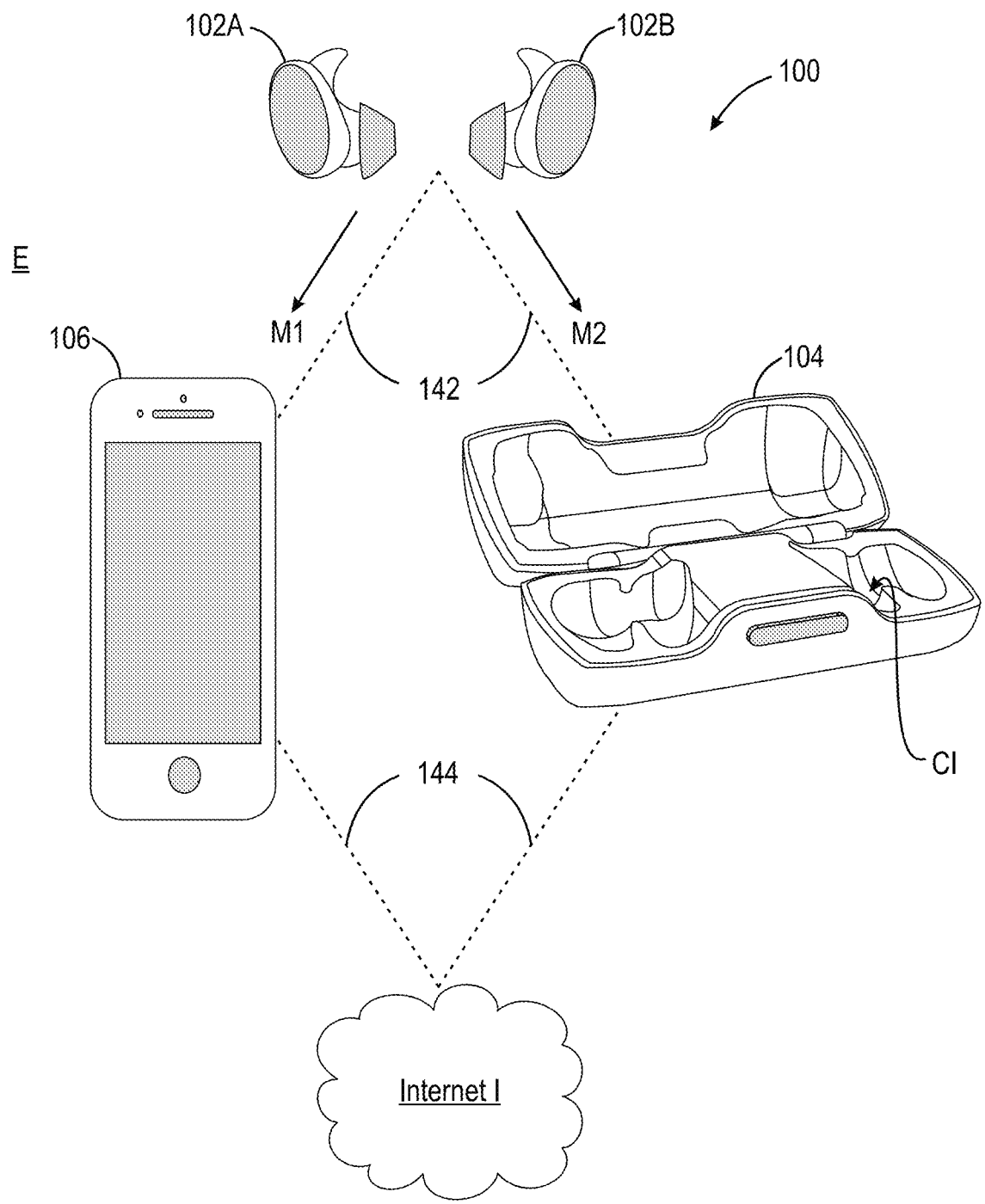
FIG. 1 is a schematic view of an audio system according to the present disclosure.

The term "wearable audio device", as used in this application, in addition to its ordinary meaning and its meaning to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver may be housed in an earcup. While some of the figures and descriptions following may show multiple wearable audio devices, it should be appreciated that wearable audio device can also refer to a single wearable audio device, having a pair of earcups (each including an acoustic driver), or a single stand-alone unit having only one earcup. Each earcup of the wearable audio devices may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 1 shows an example of a pair of truly wireless earbuds, in other examples the wearable audio device may be an over-the-ear, in-ear, on-ear, around-ear, or near-ear headset, or may be an audio eyeglasses form factor headset. In some examples, the wearable audio device may be an open-ear device that includes an acoustic driver to radiate acoustic energy towards the ear while leaving the ear open to its environment and surroundings.

The terms "matingly engage" or "matingly engaged," in addition to their ordinary meaning to one skilled in the art, are intended to mean engagement between two devices where at least a portion of a first device is configured or formed specifically to engage with a second device. For example, "matingly engaged" can include a first device having a recess, depression, or opening having a shape or perimeter that matches the exact shape of a protrusion or other portion of the second device such that the second device can fit within the recess via friction fit. Furthermore, matingly engaged can include, in addition to or in the alternative to, the frictional engagement discussed above, the intentional placement of magnets, snaps, hooks or loops (of e.g., a hook and loop fastener) at locations on the first device that would couple with magnets, snaps, hooks or loops intentionally placed at complementary locations on the second device. As will be discussed below, and illustrated in FIG. 7, case 104 is configured to matingly engage with wearable audio devices 102 where case 104 includes a recess specifically configured to accept the wearable audio devices 102 via friction fit and/or magnetic coupling.

The following description should be read in view of FIGS. 1-9. FIG. 1 is a schematic view of audio system 100 employed in an environment E according to the present disclosure. In one example, audio system 100 can include a plurality of wearable audio devices 102A-102B, a case 104, and a peripheral device 106. Plurality of wearable audio devices 102A-102B (collectively referred to as "wearable audio devices 102") are intended to be a pair of truly wireless earbuds that are capable of rendering an audio signal into audible sound, e.g., generating acoustic energy within environment E and proximate a user. It should be appreciated that in some examples, rather than a pair of truly wireless earbuds, audio system 100 can provide a single wearable audio device 102 embodied as an over-the-ear headset or an out-of-ear eyeglass form-factor audio device. As will be discussed below, each wearable audio device 102 is configured to wirelessly communicate with either peripheral device 106 or case 104 in a first mode M1 (also shown in FIG. 5) and a second mode M2 (also shown in FIG. 6), respectively.

Case 104 is intended to be a protective housing within which wearable audio devices 102 may be stored when not in use. Case 104 can be made from a polymer or plastic based material, e.g., hardened Ethylene Vinyl Acetate (EVA), High Density Polyethylene (HDPE), Low-Density Polyethylene (LDPE), or can be made from metal or other material of sufficient hardness and durability to protect the sensitive electronic components of case 104 and/or the sensitive electronic components of the wearable audio devices 102 as will be discussed below. It should be appreciated that case 104 can include two recesses configured to matingly engage with each wearable audio device 102A-102B and each recess may include a connection interface CI capable of transmitting power and/or electronic data to and/or from each wearable audio device 102. Thus, in one example, case 104 is capable of providing a charging interface between each recess and each wearable audio device 102. This charging interface may utilize wireless charging methods, e.g., using Qi wireless charging protocols or other inductive charging techniques, or may utilize a physical charging method, e.g., a multi-pin connector. Additionally, although not illustrated, case 104 may include magnets and/or ferrous metallic plates such that a magnetic field can be generated between each wearable audio device 102 and each recess, aiding in the mating engagement between the wearable audio devices 102 and the recesses when placed in case 104. Additionally, as will be discussed below, case 104 can include circuitry configured to allow case 104 to wirelessly communicate with wearable audio devices 102 as well as connect to the internet I and pass data from at least one remote server connected to the internet I to wearable audio devices 102.

Peripheral device 106 is intended to be a device capable of wirelessly communicating with either wearable audio device 102 and/or case 104. In the examples illustrated, peripheral device 106 is shown as a smart phone having a touch-screen user interface; however, it should be appreciated that peripheral device 106 can be any device capable of sending and/or receiving wireless communications from, or establishing a paired connection with, wearable audio devices 102 and/or case 104, e.g., a tablet, personal computer (PC), a smart hub, a home audio system, a stand-alone or portable speaker, a smart soundbar, or other in-the-home or on-the-go devices. It should be appreciated that such in-the-home devices are not limited to devices that are installed within a user's home and can correspond to devices used in a user's place of work, an office building, a restaurant, a café, etc. It should also be appreciated that on-the-go devices are intended to be any portable device, i.e., a device that does not need a physical connection to the internet or other device and therefore are not limited to use within a user's home. Additionally, the in-the-home devices and/or the on-the-go devices described herein, can establish a connection directly with an internet-providing source, e.g., a Local Area Network (LAN), a Wide-Area Network (WAN), or cellular tower and therefore do not require connection to an intermediary device to establish a connection with the internet.

Figure 5:
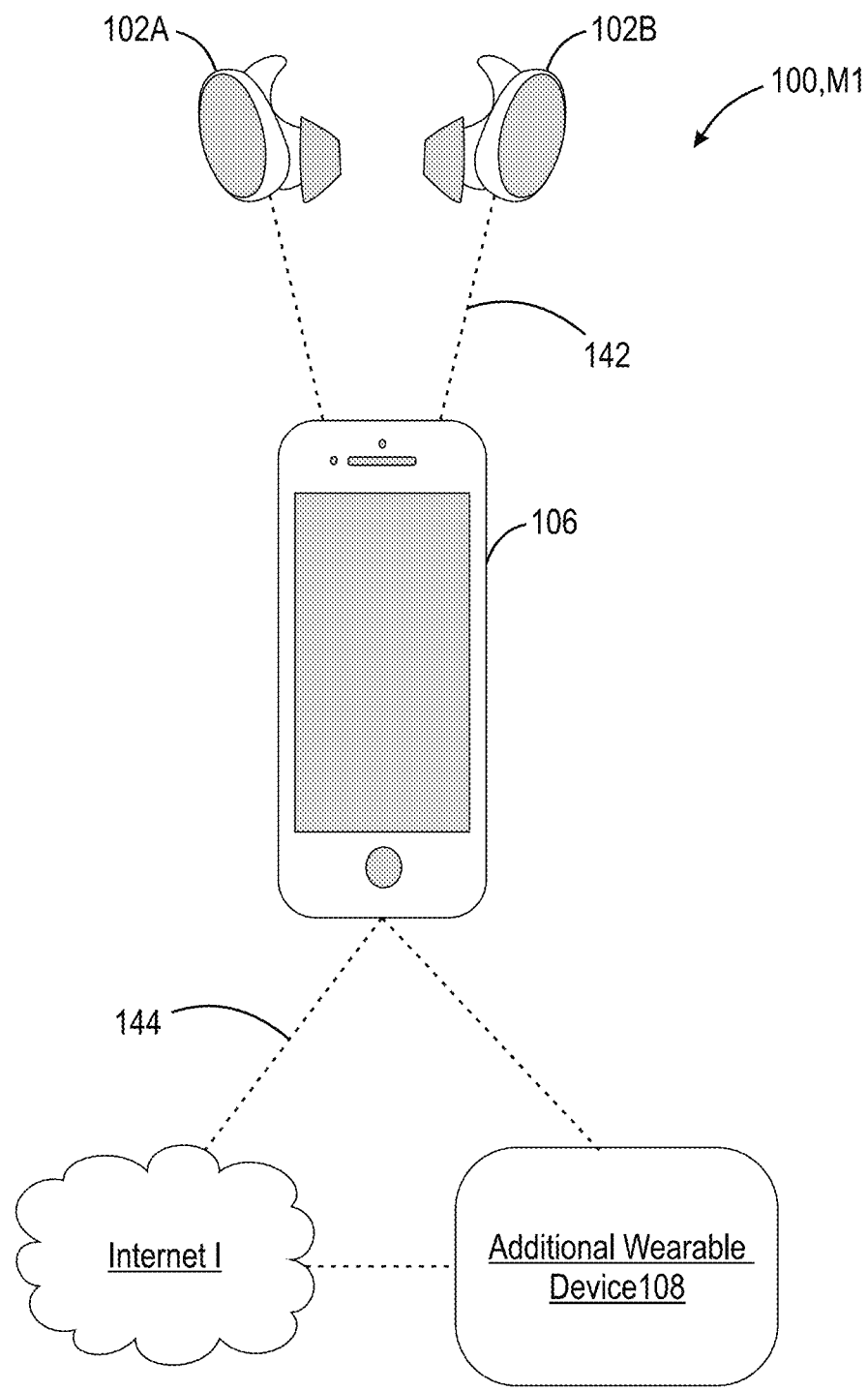
FIG. 5 is a schematic view of an audio system in a first mode according to the present disclosure.
Figure 6:
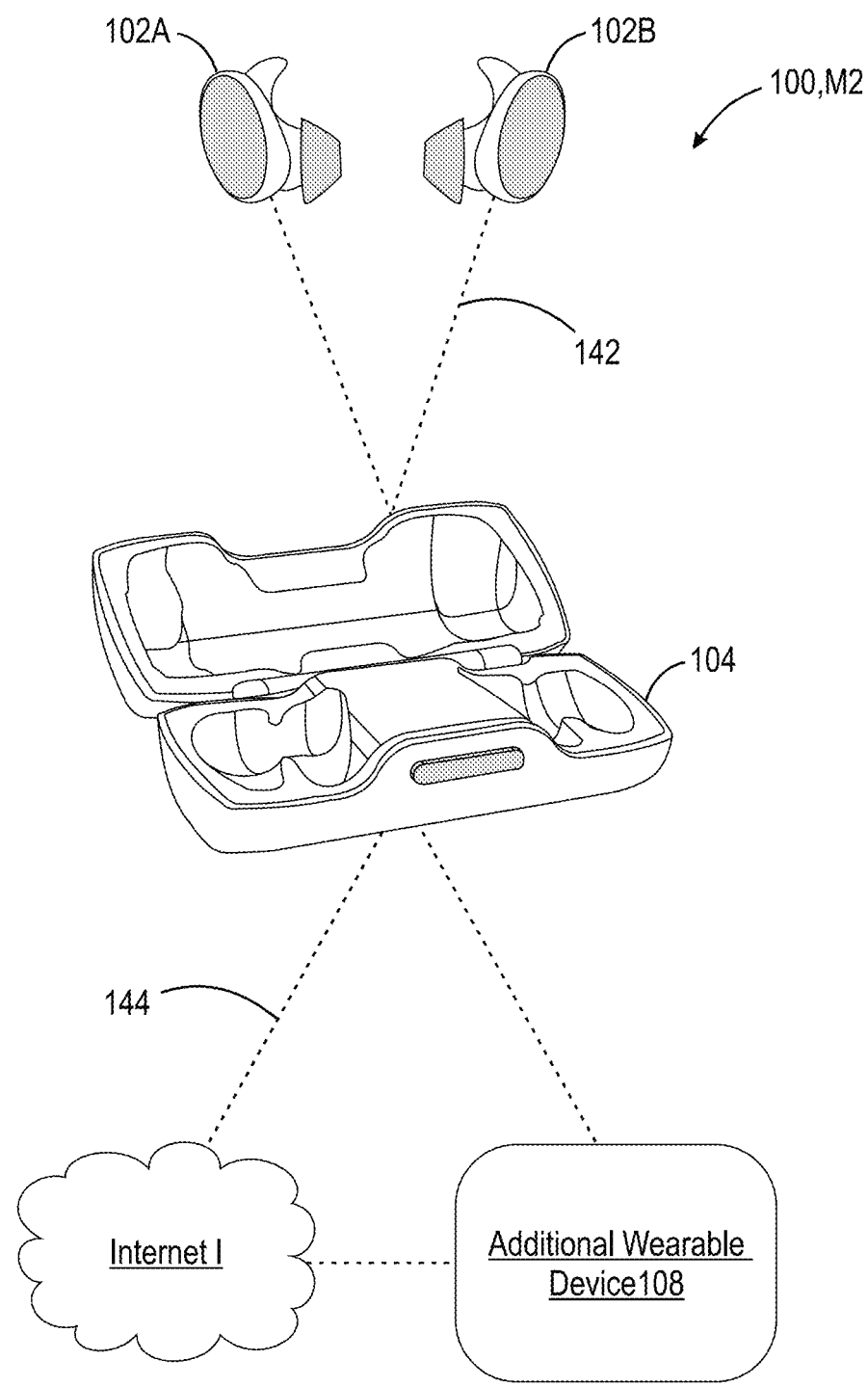
FIG. 6 is a schematic view of an audio system in a second mode according to the present disclosure.

In some examples, either case 104 or peripheral device 106 is configured to wirelessly communicate with an additional wearable device 108 (shown in FIGS. 5 and 6). Additional wearable device 108 is intended to be a device capable of sending data wirelessly to case 104 and/or peripheral device 106. In one example, as will be discussed below, additional wearable device 108 is a smart watch or smart wristband, a head-mounted sensor array, blood-pressure cuff or blood-pressure system, biological monitoring device, pedometer, or any device capable of obtaining biological data 156 (discussed below) from the wearer/user and relaying that information to case 104 or peripheral device 106.

Figure 2A:
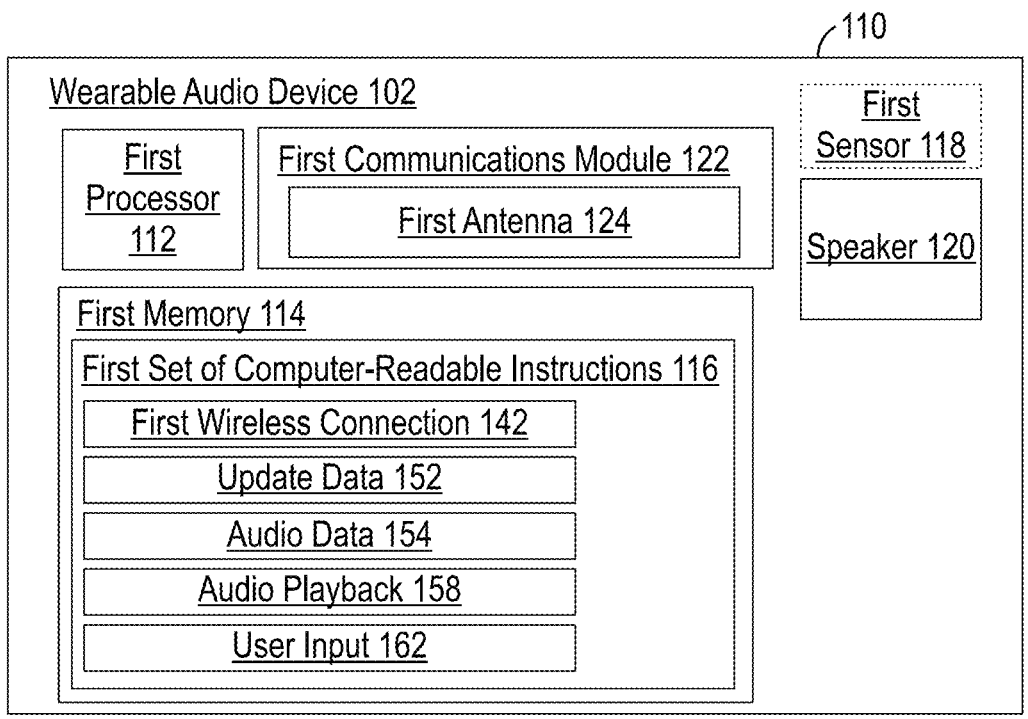
FIG. 2A is a schematic view of the internal components of each wearable audio device according to the present disclosure.

FIG. 2A illustrates a schematic view of the circuitry of each wearable audio device 102, i.e., first circuitry 110. First circuitry 110 includes first processor 112 and first memory 114 configured to execute and store, respectively, a first set of non-transitory computer-readable instructions 116 to perform the various functions of first circuitry 110 and wearable audio device 102 or wearable audio devices 102 as will be described herein. In some examples, first circuitry 110 includes a first sensor 118, at least one speaker 120, and a first communications module 122. First sensor 118 is intended to be a sensor or array of sensors arranged on, in, or in communication with first circuitry 110 of wearable audio device 102. In some examples, first sensor 118 may be selected from at least one of: a button, a touch-capacitive sensor or surface, a touch screen, a gyroscope, an accelerometer, a magnetometer, a proximity sensor, Global Positioning Systems (GPS) sensor, a microphone, a camera, or any other sensory device capable of receiving a user input 162 (discussed below). At least one speaker 120 can include an acoustic driver or acoustic transducer capable of receiving an electronic signal from first circuitry 110 and converting that electronic signal into acoustic energy within environment E and proximate a user's ear.

First communications module 122 is intended to be a circuit, plurality of circuits, or plurality of electronic components configured to send and receive wired or wireless data between wearable audio device 102 and the other devices within audio system 100. For example, first communications module 122 can include a first antenna 124 configured to send and receive wireless data, e.g., audio data 154 related to audio playback 158 (discussed below), or update data 152 (discussed below) associated with wearable audio device 102. It should be appreciated that in the examples of audio system 100 which include a plurality of wearable audio devices 102A-102B, each wearable audio device may include a sensor 118, at least one speaker 120, and a first communications module 122. Moreover, although not illustrated, first circuitry 110 can also include a battery, capacitor, super-capacitor or other power source configured to provide stored electrical power to the various components of first circuitry 110 as discussed above.

Figure 2B:
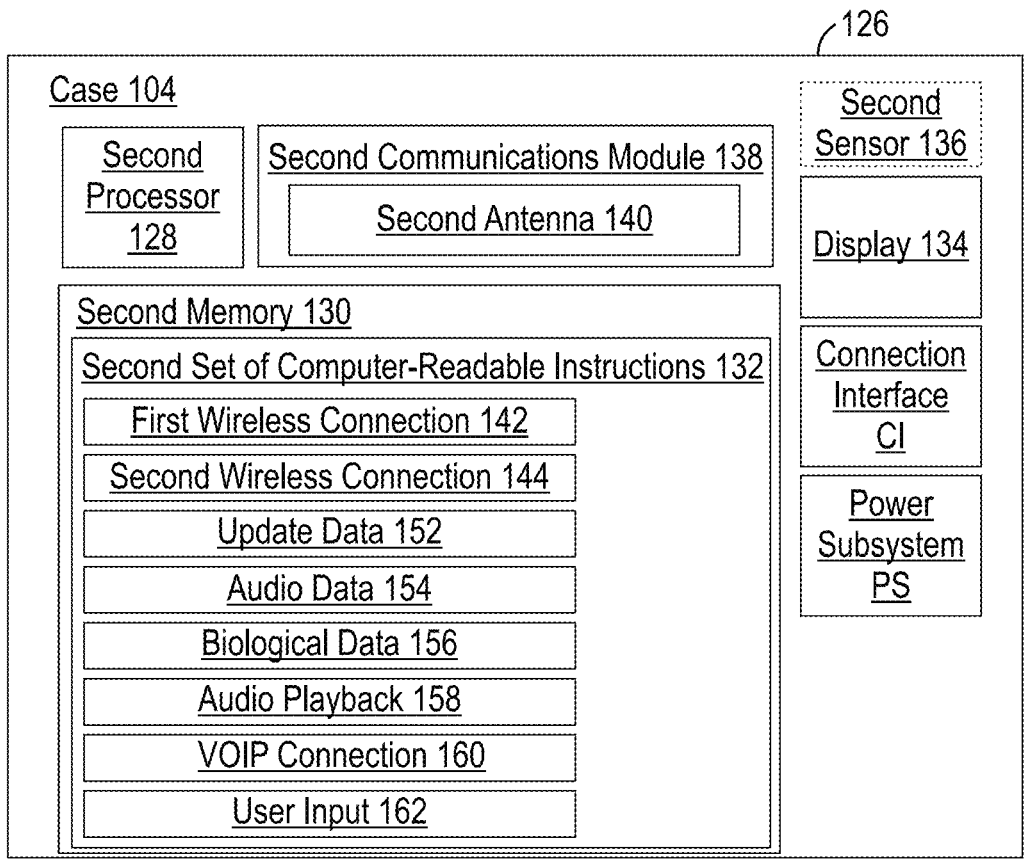
FIG. 2B is a schematic view of the internal components of a case according to the present disclosure.
Figure 3:
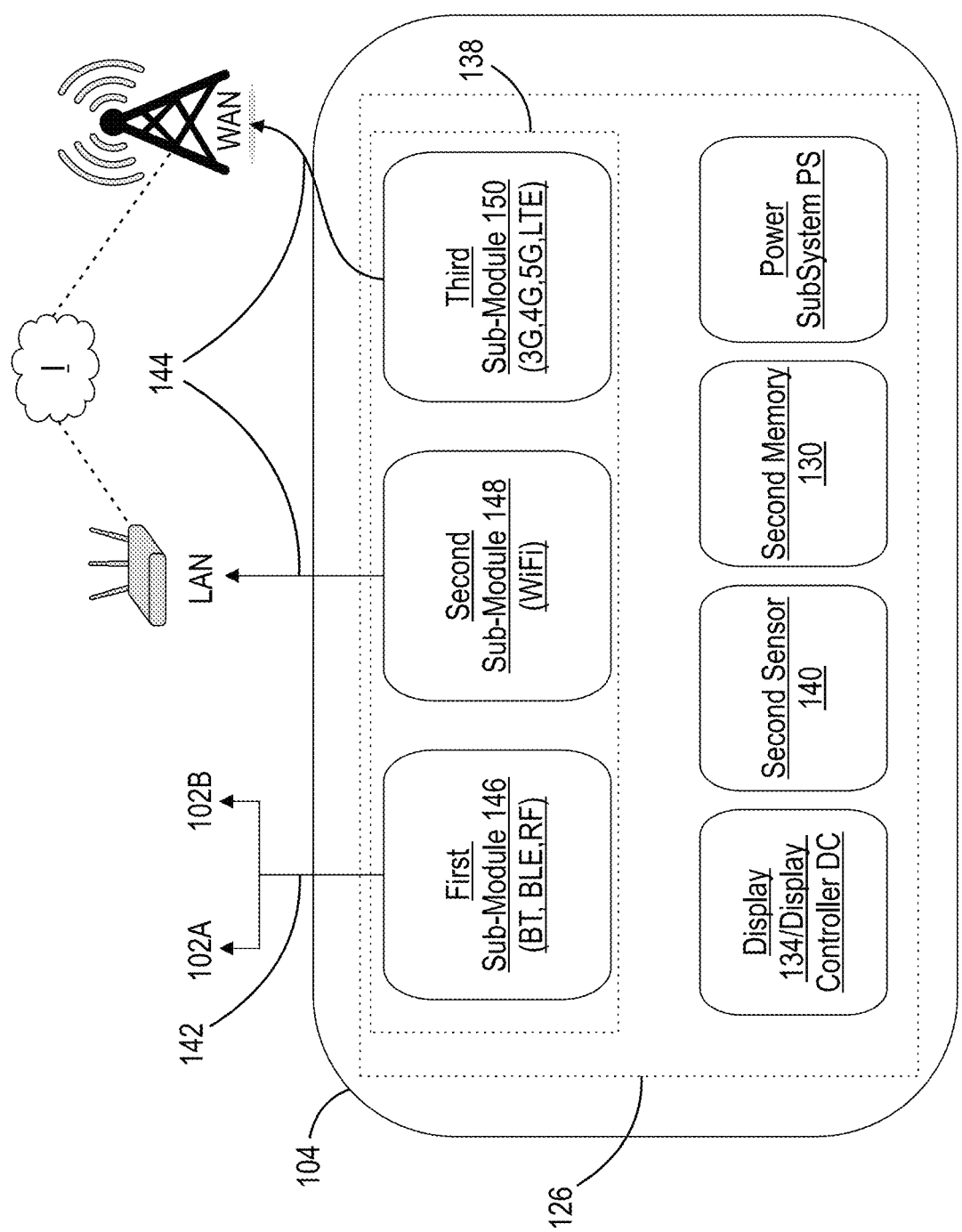
FIG. 3 is a schematic view of the internal components of a case according to the present disclosure.
Figure 4A:
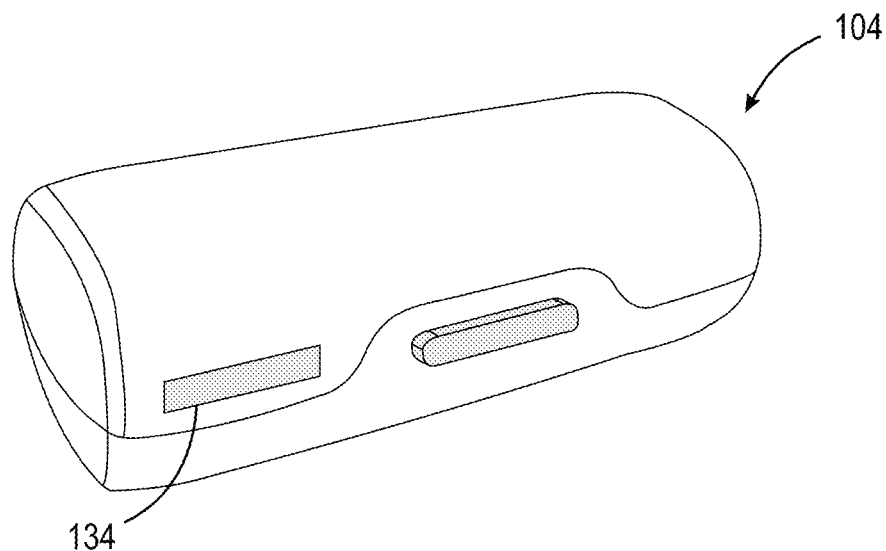
FIG. 4A is a schematic perspective view of a case and display according to the present disclosure.
Figure 4B:
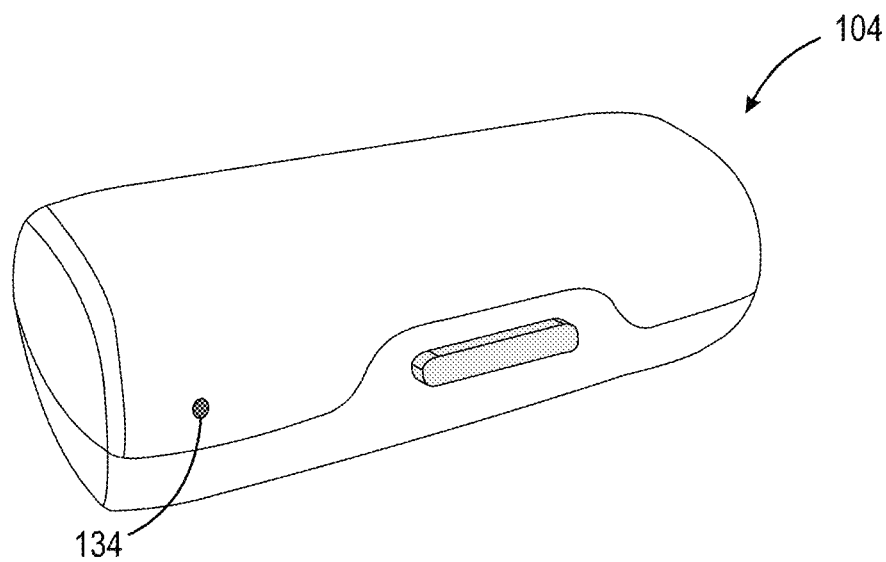
FIG. 4B is a schematic perspective view of a case and display according to the present disclosure.

FIGS. 2B and 3 are schematic illustrations of the circuitry of case 104, i.e., second circuitry 126. Second circuitry 126 includes second processor 128 and second memory 130 configured to execute and store, respectively, a second set of non-transitory computer-readable instructions 132 to perform the various functions of second circuitry 126 and case 104 as will be described herein. In some examples, second circuitry 126 includes a display 134, a second sensor 136, and a second communications module 138. Display 134 is intended to be a visual indicator or screen capable of informing the user of the current state of case 104. In one example, as illustrated in FIG. 4A, and as will be discussed below, display 134 can include a screen capable of displaying an image, symbol, text, or scrolling text, related to the current mode (e.g., first mode M1 or second mode M2, discussed below) or the content of audio playback 158 (also discussed below). In another example as illustrated in FIG. 4B, display 134 is a Light-Emitting Diode (LED) or plurality of LEDs capable of displaying various colors and light sequences that may be indicative of the status of case 104, e.g., the current mode, the content of audio playback 158, update status, or charge status.

Second sensor 136 is intended to be a sensor or array of sensors arranged on, in, or in communication with second circuitry 126 of case 104. In some examples, second sensor 136 may be selected from at least one of: a button, a touch-capacitive sensor or surface, a touch screen, a gyroscope, an accelerometer, a magnetometer, a proximity sensor, a Global Positioning Service (GPS) sensor, a microphone, a camera, or any other sensory device capable of receiving a user input 162 (discussed below). Second communications module 138 is intended to be a circuit, plurality of circuits, or plurality of electronic components configured to send and receive wired or wireless data between case 104, the other devices within audio system 100, and/or the internet I. For example, second communications module 138 can include at least one second antenna 140 configured to send and receive wireless data, e.g., audio data 154 related to audio playback 158 (discussed below), or update data 152 (discussed below) associated with wearable audio device 102. Although not illustrated, it should be appreciated peripheral device 106 and additional wearable device 108 can include similar components as first circuitry 110, or second circuitry 126, e.g., may include any number of sensors, speakers, processors, memory, non-transitory computer-readable instructions, or any of the forms of power sources discussed above. Additionally, as illustrated in FIG. 3, second circuitry 126 can also include a power sub-system PS, which can include a battery, capacitor, super-capacitor or other power source configured to provide stored electrical power to the various components of first circuitry 110 as discussed above, and can also be utilized to charge the battery, capacitor, or super-capacitor in each of the wearable audio devices 102 in the various charging methods discussed above.

As illustrated in FIG. 3, second communication module 138 is configured to establish at least two wireless data connections between devices within audio system 100 or with the Internet I, e.g., first wireless data connection 142 and second wireless data connection 144. To aid in establishing these data connections, second communication module 138 can include a plurality of sub-modules, e.g., a first-submodule 146, a second sub-module 148, and a third sub-module 150. First sub-module 146 is intended to be a chip, circuit, plurality of circuits, or plurality of electrical components that are capable of establishing first wireless data connection 142 between, e.g., second antenna 140 of second circuitry 126 of case 104 and first antenna 124 of first circuitry 110 of each wearable audio device 102. First wireless data connection 142 is intended to a be a short-wave, packet-based, connection which can utilize various wireless data protocols, e.g., Bluetooth, Bluetooth Low-Energy (BLE) or LE Audio, Radio Frequency Identification (RFID) communications, Low-Power Radio frequency transmission (LP-RF), Near-Field Communications (NFC), or any other protocol or communication standard capable of establishing a permanent or semi-permanent connection, also referred to as paired connection, between first circuitry 110 and second circuitry 126. In one example, the first wireless communication 142 is a permanent paired connection, e.g., where each wearable audio device 102 is configured to maintain a constant paired communication connection with case 104. Second sub-module 148 is intended to be a chip, circuit, plurality of circuits, or plurality of electrical components that are capable of establishing second wireless data connection 144 between, e.g., second antenna 140 of second circuitry 126 of case 104 and the Internet I. Similarly, third sub-module 150 is intended to be a chip, circuit, plurality of circuits, or plurality of electrical components that are capable of establishing second wireless data connection 144 between, e.g., second antenna 140 of second circuitry 126 of case 104 and the Internet I. Second sub-module 148 is configured to establish second wireless data connection 144 between case 104 and, for example, a Local Area Network (LAN), via a wireless access point or network router and is intended to establish second wireless data connection 144 using WiFi or IEEE wireless standards, e.g., IEEE 802.11 a/b/g/n/ac/ax. It should be appreciated that second sub-module 148 is configured to establish second wireless data connection with a LAN via a wireless access point or router which can further connect to the internet I via a Wide Area Network (WAN). Third sub-module 150 is configured to establish second wireless data connection 144 between case 104 and, for example, a WAN connection, via a local cell tower and/or a network of cell towers and satellite connections which utilize the third generation (3G), fourth generation (4G), or fifth generation (5G), International Telecommunications Union (ITU) standard. It should also be appreciated that the networks utilized may be networks between these ITU standards, e.g., third generation long-term evolution (3G LTE), fourth generation LTE (4G LTE), or fifth generation evolution (5Ge) networks. It should be appreciated that each sub-module, i.e., first sub-module 146, second sub-module 148, and third sub-module 150, can each utilize a discrete second antenna 140, or can share one or more second antenna 140 in any conceivable combination. For example, as it is likely that case 104 will establish second wireless data connection 144 to the Internet I via a LAN connection using second sub-module 148, or via a WAN connection using third sub-module 150, a single second antenna 140 may be provided between and used by both second sub-module 148 and third sub-module 150. Thus, it should be appreciated that a single chip, circuit, or plurality of electronic components can be provided to perform the functions of both the second sub-module 148 and the third sub-module 150.

As discussed above, and as illustrated in FIGS. 4A and 4B, display 134 can include a screen as illustrated in FIG. 4A, which can provide a visual indication of the status of case 104, the mode that audio system 100 is in, or the content of audio playback 158 (discussed below), via, an image, symbol, text, or scrolling text. Alternatively, as illustrated in FIG. 4B, display 134 can include a Light-Emitting Diode (LED) or plurality of LEDs capable of displaying various colors and light sequences that may be indicative of the status of case 104, the mode of audio system 100, or the content of audio playback 158 (discussed below). It should be appreciated that, as illustrated in FIG. 3, case 104 can include a display controller DC or display circuitry capable of providing the electrical power or data necessary to display or render the images, text, scrolling-text, or LED based status information to the user.

As illustrated in FIGS. 1, 5 and 6, audio system 100 is configured to operate in one of two modes, i.e., a first mode M1 and a second mode M2. FIG. 5 illustrates, audio system 100 in a first mode M1. First mode M1 defines an operational mode where wearable audio devices 102A-102B are configured to establish a first wireless connection 142 with peripheral device 106. Additionally, as illustrated in FIG. 5, in the first mode M1, peripheral device 106 is also configured to establish a second wireless data connection 144 between peripheral device 106 and the internet I. Furthermore, as illustrated in FIG. 5, peripheral device 106 can also establish an additional wireless data connection with additional wearable audio device 108. As will be discussed below in detail, peripheral device 106 can be configured to receive update data 152, audio data 154, and biological data 156 from the Internet I and/or additional wearable device 108.

FIG. 6, illustrates audio system 100 operating in a second mode M2. Second mode M2 defines an operational mode where wearable audio devices 102A-102B are configured to establish first wireless connection 142 with case 104, using, for example, first sub-module 146 of second communications module 138 of case 104. Additionally, as illustrated in FIG. 6, in the second mode M2, case 104 is also configured to establish second wireless data connection 144 between case 104 and the internet I directly, using, for example, second sub-module 148 or third sub-module 150, via a LAN or WAN connection, respectively. Furthermore, as illustrated in FIG. 6, case 104 can also establish an additional wireless data connection with additional wearable audio device 108.

In the second mode M2, case 104 is configured to receive update data 152, audio data 154, and biological data 156 directly from the internet I or from additional wearable device 108. Update data 152 is intended to be data, computer code, or computer-readable instructions associated with updating or overwriting the operational software or the firmware of wearable audio devices 102. In one example, update data 152 includes computer-readable instructions meant to update or upgrade the firmware of wearable audio device 102A, wearable audio device 102B, or both wearable audio devices 102A-102B. As will be discussed below, in second mode M2, update data 152 can be received by case 104 directly at any time, as case 104 can receive update data 152 from the second wireless data connection 144 and store update data 152 in second memory 130 of case 104. Later, when case 104 and wearable audio devices 102A-102B establish first wireless data connection 142, update data 152 can be sent from case 104 to wearable audio devices 102A-102B. This configuration allows for faster updates to be provided to each wearable audio device when they are in communication with case 104.

Audio data 154, in one example is data related to one or more audio files. The audio files can correspond to music files, audio-book files, video files containing audio data, or other sound related file structures. In the examples disclosed herein, audio data 152 may be rendered by, for example, one or more speakers 120 within wearable audio devices 102A-102B, forming audio playback 158, where audio playback 158 is the audible manifestation of the rendered audio data 152 as perceivable sound within environment E and proximate the user. In one example, audio data 152 may be stored, in various audio file formats or video file formats, in local memory storage, e.g., second memory 130 of case 104. In other examples, audio data 152 is streamed, e.g., where portions of the complete audio files are sent in a steady, continuous flow of data, to case 104 and buffered in second memory 130, allowing audio playback 158 to be rendered via the at least one speaker 120 of wearable audio devices 102A-102B while the remaining portions of the audio file are still being received by the case 104. Thus, the audio data 152 can be streamed to the case 104 over second wireless data connection 144 from at least one remote server or service over the Internet I, and streamed from case 104 to wearable audio devices 102. Audio data 152 can also include data related to web-based voice-over-internet-protocol (VOIP) communications or connections 160. For example, a user can configure case 104 such that case 104 can receive VOIP communications from an internet-based VOIP service or connection 160 and forward or stream audio data 152, as well as audio data obtained from first sensor 118 (if first sensor 118 is a microphone) between wearable audio devices 102 and case 104 via first wireless data connection 142 and from case 104 to the VOIP service via second wireless data connection 144. Biological data 156 is intended to be data related to the biological processes of the user's body, e.g., heart rate, respiratory rate, sleep cycle, blood-pressure, blood-oxygen level, movement of the user, movement of a body part of the user, body position, etc. Biological data 156 can be gathered via additional wearable device 108, where additional wearable device 108 can be a smart watch, smart wristband, head-mounted sensor array, blood-pressure system, biological monitoring system, pedometer, etc.

To switch between first mode M1 and second mode M2, the user can provide an input, e.g., user input 162. User input 162 can be provided through first sensor 118 of first circuitry 110 of each wearable audio device 102, through second sensor 136 of second circuitry 126 of case 104, through a similar sensory input provided to peripheral device 106 or additional wearable devices 108, or can be predetermined based on one or more case states 164A-164D (discussed below). It should be appreciated that, given the various examples of first sensor 118 or second sensor 136 discussed above, user input 162 can be a plurality of different inputs corresponding to the plurality of different sensors. For example, user input 162 can be selected from: an electronic signal associated with depression or engagement with a button, touch-capacitive sensor, surface, or touchscreen; an electronic signal associated with a motion or gesture of the user via a gyroscope, an accelerometer, or a magnetometer; an electronic signal associated with the proximity of each audio device within system 100 relative to each other or relative to the user via a proximity sensor; the devices positions or locations via a Global Positioning Service (GPS) sensor; a voice or sound input via a microphone, or a visual input taken via a camera.

In one example, first sensor 118 is a touch-capacitive sensor provided on, in, or in communication with at least one of the wearable audio devices 102. The user can depress or engage first sensor 118, and upon depressing first sensor 118, audio system 100 can switch into first mode M1, where each wearable audio device 102 is configured to connect with peripheral device 106 via the first wireless data connection 142, and peripheral device 106 is configured to connect to the internet I via second wireless data connection 144. If the user should depress first sensor 118 a second time, audio system 100 can switch from first mode M1 to second mode M2, where each wearable audio device 102 is configured to establish first wireless connection 142 with case 104 and case 104 is configured to establish second wireless data connection 144 with the Internet I.

In another example, second sensor 136 is a button provided on, in, or in communication with case 104. The user can depress or engage second sensor 136, and upon depressing second sensor 136, audio system 100 can switch into first mode M1, where each wearable audio device 102 is configured to connect with peripheral device 106 via the first wireless data connection 142, and peripheral device 106 is configured to connect to the internet I via second wireless data connection 144. If the user should depress second sensor 136 a second time, audio system 100 can switch from first mode M1 to second mode M2, where each wearable audio device 102 is configured to establish first wireless connection 142 with case 104 and case 104 is configured to establish second wireless data connection 144 with the Internet I.

Figure 7:
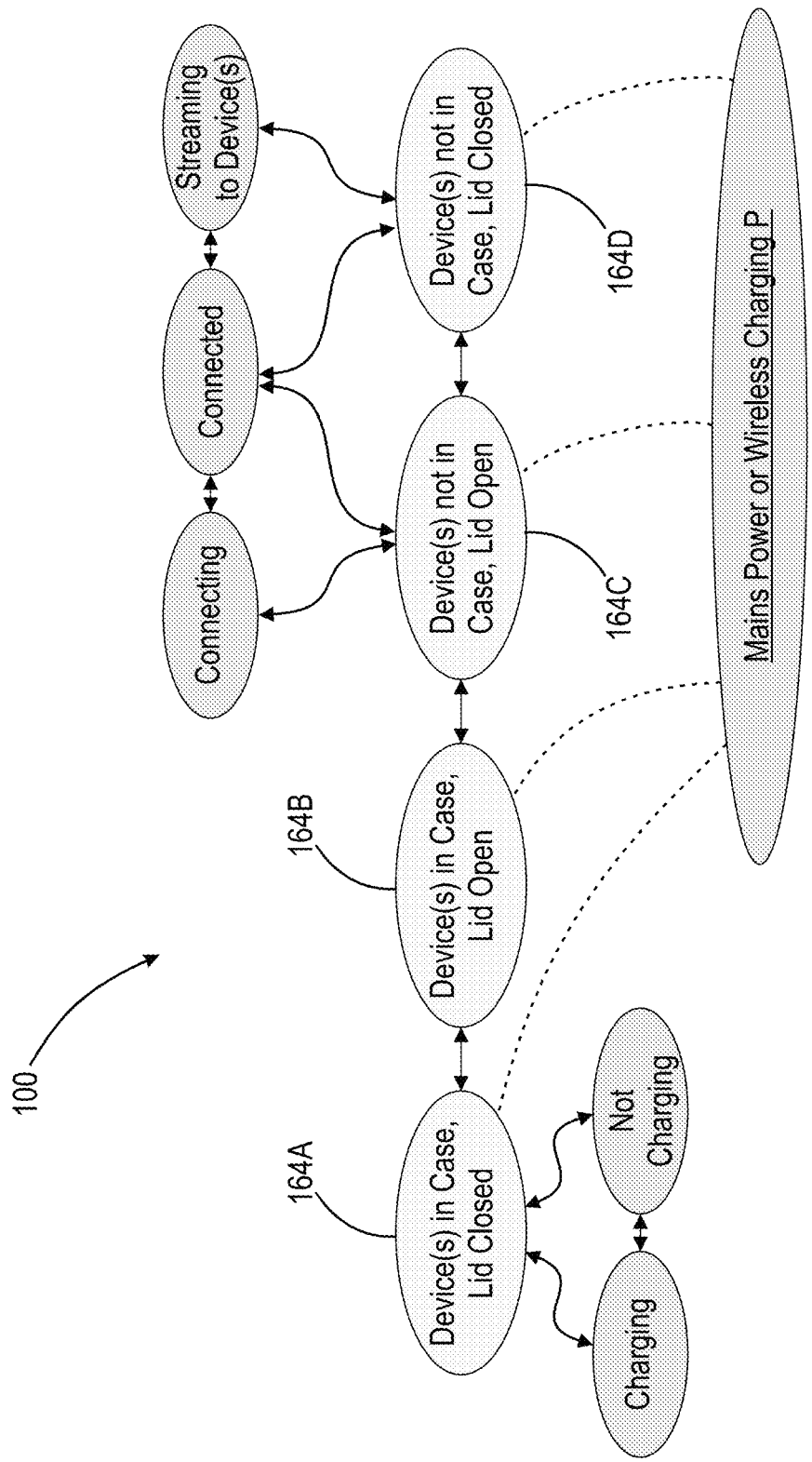
FIG. 7 is a flow chart illustrated various case states according to the present disclosure.

FIG. 7 illustrates a flow chart containing the various states of case 104, i.e., case states 164A-164D. First case state 164A corresponds to a case state where each wearable audio device 102 is matingly engaged with case 104, e.g., via the recesses discussed above, and the lid of the case is closed or engaged. Second case state 164B corresponds to a case state where each wearable audio device is matingly engaged with case 104, e.g., via the recesses discussed above, and the lid of case 104 is open or disengaged. Third case state 164C corresponds to a case state where each wearable audio device is removed from case 104 and the lid of case 104 is open or disengaged. Fourth case state 164D corresponds to a case state where each wearable audio device is removed from case 104 and the lid of case 104 is closed or engaged.

As illustrated in FIG. 7, while in the first case state 164A, case 104 can be configured to charge or not charge each of the wearable audio devices 102, e.g., via the charging interface discussed above. Additionally, while in first case state 164A, case 104 can provide wearable audio device 102 with update data 152 to update the software or firmware utilized by each wearable audio device. Additionally, upon opening the lid of case 104 and removing the wearable audio devices 102 from their recesses within case 104, i.e., entering third case state 164C, audio system 100 is configured to establish first wireless data connection 142 between case 104 and each wearable audio device 104 (if in the first mode M1), or, between peripheral device 106 and each wearable audio device 102 (if in the second mode M2). Additionally, as illustrated in FIG. 7, at each case state 164A-164D the case 104 can be configured to receive an electrical or magnetic charging signal from a standard mains power supply or from a wireless charging connection P.

It should be appreciated that switching between case states 164A-164D, as described above, can be utilized by audio system 100 as a user input, e.g., user input 162, to switch between first mode M1 and second mode M2. In one example, switching between second case state 164B and third case state 164C, i.e., where the wearable audio devices 102 are removed from the recesses within case 104, can act as user input 162 and operate to switch audio system 100 into first mode M1 or switch audio system 100 from first mode M1 to second mode M2. It should be appreciated that, as switching between each case state 164A-164D requires some form of user interaction with audio system 100, switching between any two states of case states 164A-164D can operate as user input 162.

During operation, audio system 100 can include a pair of truly wireless earbuds, i.e., wearable audio devices 102A-102B, a case 104 having recesses configured to matingly engage with each wearable audio device 102, and a peripheral device 106. The user can remove wearable audio device 102A-102B and secure them within the user's right and left ears, respectively. Upon receipt of user input 162, e.g., the user can depress or engage with first sensor 118 (in the form of a button or touch-capacitive sensor) located on, in, or in communication with at least one of the wearable audio devices 102, or the user can depress or engage with second sensor 136 (in the form of a button or touch capacitive sensor) located on, in, or in communication with case 104, audio system 100 can switch into first mode M1. In first mode M1, each wearable audio device 102 is configured to establish a first wireless data connection 142, with peripheral device 106. Should the user depress or engage first sensor 118 or second sensor 136 a second time, audio system 100 can switch from first mode M1 to second mode M2. In the second mode, each wearable audio device 102 is configured to establish first wireless data connection 142, e.g., using Bluetooth Low-Energy or LE Audio connection protocols, with first sub-module 146 of second circuitry 126 of case 104. Additionally, once in second mode M2, case 104 can establish a second wireless data connection 144 with internet I using, e.g., second sub-module 148 to connect to a LAN connection via a wireless access point or router and then to the internet I, or using third sub-module 150 to connect directly to a WAN using a local cell tower and/or satellite connection to access internet I. Once in second mode M2, the user can utilize second wireless data connection 144 to stream audio data 154, e.g., relating to a music file or audiobook audio file, from a remote server or service over the internet I, and case 104 can buffer audio data 154 in second memory 130 of second circuitry 126. Additionally, once buffered in second memory 130, case 104 can stream the buffered audio data 154 to each wearable audio device via first wireless data connection 142 using, e.g., first sub-module 146 and first antenna 124 of first circuitry 110 of each wearable audio device 102, and render an audio playback, e.g., audio playback 158 to user via at least one speaker 120. Thus, in the first mode M1, audio data 154 related to audio playback 158 is received from peripheral device 106 and in the second mode M2, audio data 154 related to audio playback 158 is received from case 104.

During operation, regardless of whether audio system 100 is in first mode M1 or second mode M2, and regardless of whether case 104 is in any of the plurality of case states 164A-164D, case 104 can receive update data 152 via a direct connection to the internet I, e.g., via second wireless data connection 144 using second sub-module 148 or third sub-module 150, and store it in memory, i.e., second memory 130. Later, while audio system 100 is in second mode M2, discussed above, case 104 can send the update data 152, associated with the wearable audio devices 102, to each wearable audio device 102 via first wireless data connection 142, via first sub-module 146 and first antenna 124 of first circuitry 110 or via the charging interface within each recess of case 104.

As mentioned above use of audio system 100 in second mode M2 provides numerous advantages. The dedicated, direct, connection between the case 104 and the internet I, allow for additional connective schemes and functionality to be seamlessly provided by audio system 100. First, as case 104 will typically be carried by the user or close to the user while in use, operation of audio system 100 in second mode M2, i.e., where case 104 is simultaneously connected to the wearable audio devices 102 and the internet I, allows for data related to Cloud-Based services, and other information to be passed from the internet I to case 104 and to wearable audio devices 102 directly without the need for peripheral device 106. These Cloud-based services can include services and data relating to social networking, messaging, music services, news, entertainment, and Voice-Over-Internet-Protocol (VOIP) communication services. Furthermore, use of the additional functionality of case 104 in second mode M2, audio system 100 can provide seamless integration between case 104 and in-the-home wireless devices such as smart speakers, smart soundbars, etc., and enables transfer of audio data 154 in the form of audio streaming data from the case to, e.g., home smart speakers.

Additional benefits of operating audio system 100 in second mode M2 include benefits to the manufacturer and to the user. Benefits for the manufacturer include: the ability to provide faster updates, i.e., via update data 152, to wearable audio devices 102 during manufacturing, e.g., in a reduction of re-flashing time and uploading time; the ability to provide device updates Over-The-Air (OTA) at the point of sale or as soon as the user purchases wearable audio devices 102 and case 104; the ability to maintain contact with the user for extended durations of time; unification of in-the-home and on-the-go products involving Cloud Services; and the ability to collect and store data relating to user profiles, usage patterns and preferences, sensor data including biological data 156 obtained from additional wearable device 108 such as a smart-watch or wristband, etc. User benefits of operating audio system 100 include: transparent updates, via update data 152, to the latest software/firmware and easy access to the latest product features; faster updates, via update data 152, while wearable audio devices 102 are matingly engaged with the recesses within case 104; smaller size or form-factor for each wearable audio device 102 if current functionality is off-loaded onto case 104; and freedom from requiring a connection to peripheral device 106, e.g., a smart phone, for routine non-streaming applications and updates. Moreover, once additional connectivity between case 104 and the internet I or Cloud-based services is possible via the configuration provided, a further benefit to both the user and the manufacturer can include, obtaining or extracting diagnostic data from all of the devices within audio system 100 and sending that diagnostic data via the second wireless data connection 144 over the internet I to a Cloud-based service which can utilize the data to improve user experiences.

Figure 8:
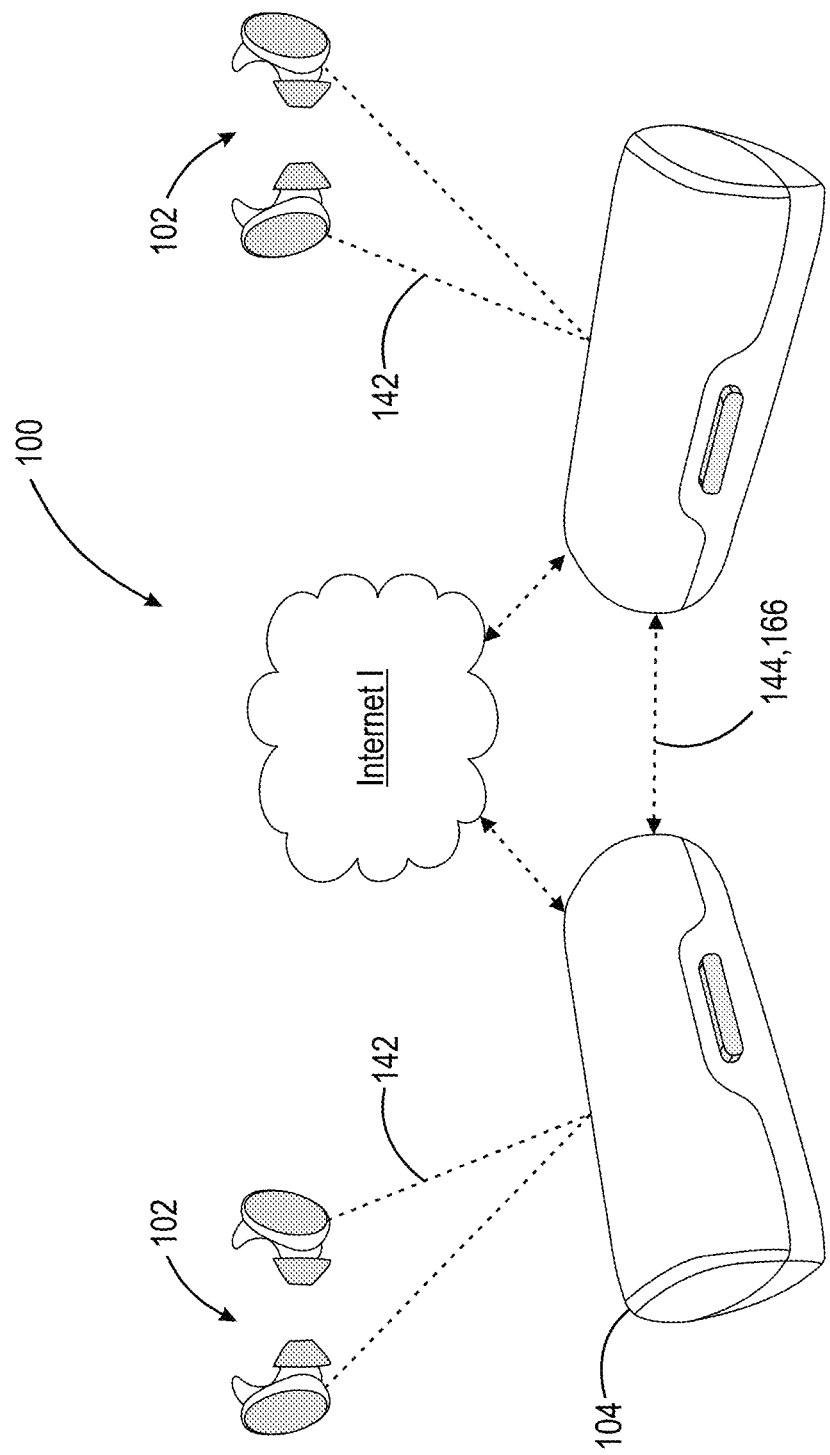
FIG. 8 is a schematic view of audio system 100 with multiple cases according to the present disclosure.

FIG. 8 illustrates an additional benefit of operating audio system 100 in second mode M2. As illustrated, the additional connectivity and functionality of case 104, e.g., the ability to use second sub-module 148 and/or third sub-module 150 to gain access to the internet I, can create new device environments where multiple cases 104 are configured to communicate with each other directly or indirectly over an internet connection I, i.e., via a case-to-case connection 166, and/or synchronize with a third party source directly or indirectly over the internet I, to provide users with synchronized content, e.g., synchronized audio streams. Thus, FIG. 8 illustrates that each case 104 can establish a first wireless data connection 142 between each case and each set of wearable audio devices 102 and each case can establish a case-to-case-connection 166 through second wireless data connection 144. Grouping multiple cases 104 could utilize a Cloud-based grouping service or may utilize proximity sensing between cases 104, e.g., in the event second sensor 136 is a proximity sensor.

Figure 9:
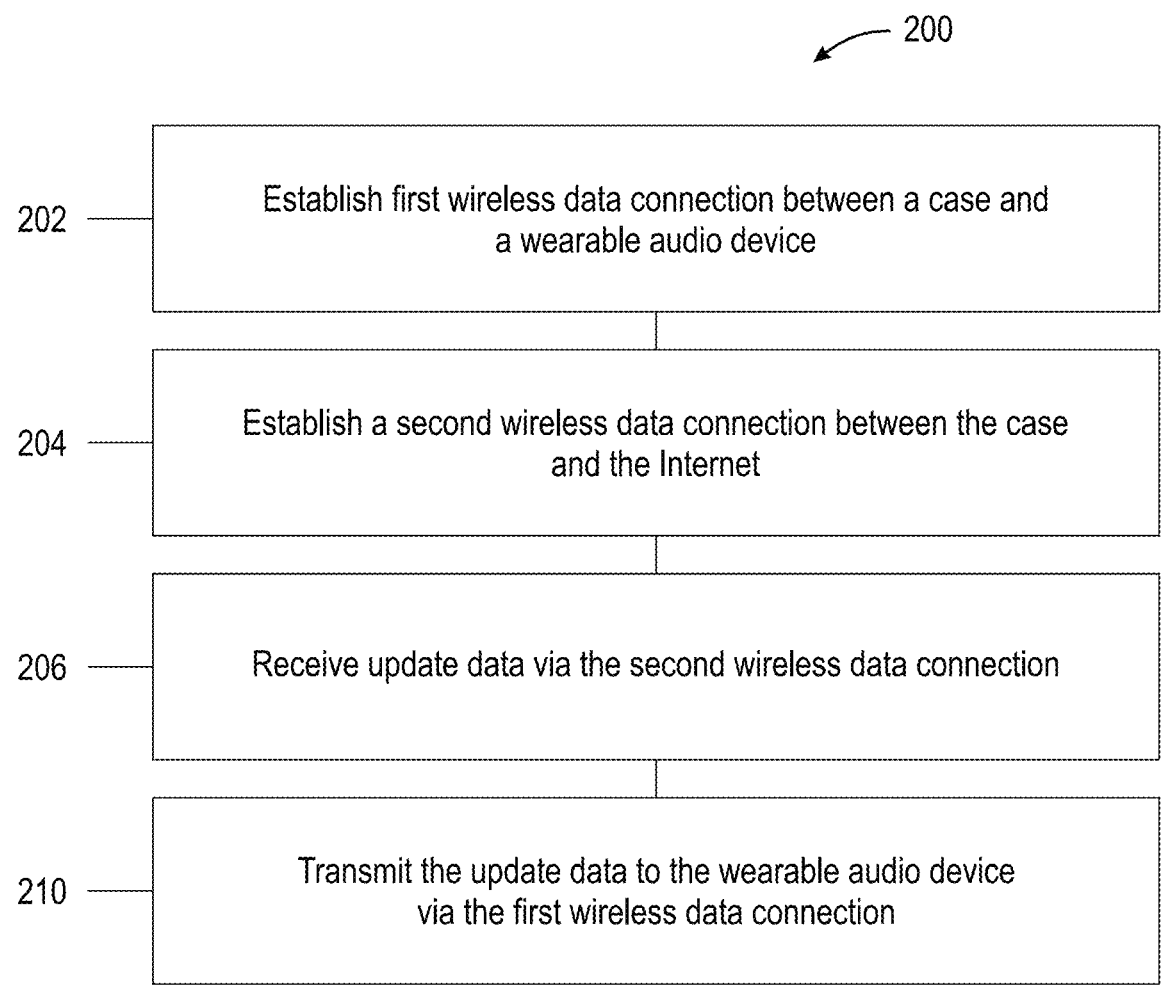
FIG. 9 is a flow chart illustrating the steps of a method according to the present disclosure.

FIG. 9 illustrates a flow chart of method 200 according to the present disclosure. Method 200 includes, for example: establishing a first wireless data connection 142 between the case 104 and the wearable audio device 102 (step 202); establishing, via the case 102, a second wireless data connection 144 that provides access to the Internet I (step 204); receiving update data 152 associated with the wearable audio device 102 via the second wireless data connection 144 (step 206); and transmitting the update data 152 to the wearable audio device 102 using the first wireless data connection 142 (step 208).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A system comprising:
  a wearable audio device; and
  a case, the wearable audio device configured to matingly engage with the case, the case configured to establish a first wireless data connection with the wearable audio device, wherein the first wireless data connection is a paired wireless connection, and wherein the case is configured to establish a second wireless data connection, wherein the second wireless data connection is an Internet connection;
  wherein the case is further configured to:
    receive update data associated with the wearable audio device using the second wireless data connection; and
    transmit the update data to the wearable audio device using the first wireless data connection.

2. The system of claim 1, wherein in a first mode, the wearable audio device is configured to receive and render audio data related to an audio playback from a peripheral device, and wherein in a second mode, the wearable audio device is configured to receive and render the audio data related to the audio playback from the case.

3. The system of claim 2, wherein the case is configured to switch between the first mode and the second mode in response to a user input.

4. The system of claim 3, wherein the user input is selected from, a mechanical input, a touch-capacitive sensor input, a gesture input, or a voice input.

5. The system of claim 4, wherein the gesture input is obtained from an accelerometer, a gyroscope, a magnetometer, or a global positions systems sensor.

6. The system of claim 1, wherein the first wireless data connection uses Bluetooth Classic, Bluetooth Low-Energy (BLE), or Low-Power Radio Frequency communications.

7. The system of claim 1, wherein the case further comprises memory arranged to store at least one of: audio data files, user profile data, or sensor data.

8. The system of claim 1, wherein the case does not include a display.

9. The system of claim 1, wherein the case includes a display.

10. The system of claim 1, wherein the case further includes at least one battery and a connection interface for charging the wireless audio device.

11. The system of claim 1, wherein the case further comprises a lid, and the case is configured to switch between a first mode and a second mode based on: (i) whether the lid is open or closed, and/or (ii) whether the first wearable audio device is matingly engaged with the case.

12. The system of claim 1, wherein the case is arranged to receive data from an additional wearable device, wherein the additional wearable device is a smart watch, smart wristband, a biological monitoring device, or a pedometer.

13. The system of claim 1, wherein the case is arranged to establish a Voice Over Internet Protocol connection using the second wireless data connection.

14. The system of claim 1, wherein the case is arranged to establish a case-to-case data connection with an additional case within an environment via the second wireless data connection.

15. The system of claim 1, wherein the update data includes data related to a firmware update for the wearable audio device.

16. A method of establishing wireless data connections between a case and a wearable audio device, the method comprising:

establishing a first wireless data connection between the case and the wearable audio device, wherein the first wireless data connection is a paired wireless connection;

establishing, via the case, a second wireless data connection, wherein the second wireless data connection is an Internet connection;

receiving update data associated with the wearable audio device via the second wireless data connection; and transmitting the update data to the wearable audio device using the first wireless data connection.

17. The method of claim 16, wherein in a first mode, the wearable audio device is configured to receive and render audio data related to an audio playback from a peripheral device, and wherein in a second mode, the wearable audio device is configured to receive and render the audio data related to the audio playback from the case.

18. The method of claim 17, wherein the case is configured to switch between the first mode and the second mode in response to a user input.

19. The method of claim 16, wherein the case further comprises a lid, and the case is configured to switch between a first mode and a second mode based on: (i) whether the lid is open or closed, and/or (ii) whether the first wearable audio device is matingly engaged with the smart case.

20. The method of claim 16, wherein the case further includes at least one battery and a connection interface for charging the wireless audio device.

\* \* \* \* \*